(12) United States Patent
van Wijk et al.

(10) Patent No.: US 9,822,604 B2
(45) Date of Patent: Nov. 21, 2017

(54) PRESSURE VARIANCE SYSTEMS FOR SUBSEA FLUID INJECTION

(71) Applicants: Shell Oil Company, Houston, TX (US); Cameron International Corporation, Houston, TX (US)

(72) Inventors: Johannes van Wijk, GS Rijswijk (NL); Melvyn F. Whitby, Houston, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 14/952,630

(22) Filed: Nov. 25, 2015

(65) Prior Publication Data

US 2017/0145774 A1   May 25, 2017

(51) Int. Cl.
| | | |
|---|---|---|
| *E21B 33/076* | (2006.01) | |
| *E21B 17/01* | (2006.01) | |
| *E21B 33/035* | (2006.01) | |
| *E21B 37/06* | (2006.01) | |
| *E21B 41/02* | (2006.01) | |

(52) U.S. Cl.
CPC ............ *E21B 33/076* (2013.01); *E21B 17/01* (2013.01); *E21B 33/0355* (2013.01); *E21B 37/06* (2013.01); *E21B 41/02* (2013.01); *C09K 2208/22* (2013.01); *C09K 2208/32* (2013.01)

(58) Field of Classification Search
CPC .... E21B 33/0355; E21B 33/076; E21B 37/06; E21B 41/02; C09K 2208/22
See application file for complete search history.

(56) References Cited

U.S. PATENT DOCUMENTS

| | | | | |
|---|---|---|---|---|
| 4,821,799 | A | * | 4/1989 | Wong ....................... F16J 15/40 166/385 |
| 5,166,677 | A | * | 11/1992 | Schoenberg ........ E21B 33/0355 166/335 |
| 7,108,006 | B2 | * | 9/2006 | Armstrong .......... E21B 33/0355 137/14 |

(Continued)

FOREIGN PATENT DOCUMENTS

GB        2373546 A  *  9/2002  ......... E21B 33/0355

*Primary Examiner* — Matthew R Buck
(74) *Attorney, Agent, or Firm* — Chamberlain Hrdlicka

(57) ABSTRACT

The present disclosure generally relates to a system for injecting a fluid into a subsea hydrocarbon extraction component. The system comprises a pressure variance device including an ambient chamber and a variance chamber, the ambient chamber exposed to an external subsea environment and configured to transfer the pressure to the variance chamber via a pressure variance device piston. The system further comprises an accumulator including a fluid delivery chamber and a pressure chamber, the pressure chamber configured to receive the pressure from the variance chamber and transfer the pressure to the fluid delivery chamber via an accumulator piston. The system also comprises a control system configured to regulate injection of the fluid from the fluid delivery chamber into the hydrocarbon extraction component. In this way, the system can intensify or deintensify a hydrostatic pressure in the subsea environment to inject chemicals in the hydrocarbon extraction component at a desired pressure.

16 Claims, 3 Drawing Sheets

(56) References Cited

U.S. PATENT DOCUMENTS

| | | | |
|---|---|---|---|
| 7,628,207 B2 * | 12/2009 | Leonardi | E21B 33/0355 166/344 |
| 8,376,050 B2 * | 2/2013 | Cumming | E21B 37/06 166/250.01 |
| 8,833,465 B2 * | 9/2014 | Kotrla | E21B 33/0355 166/358 |
| 8,857,175 B2 * | 10/2014 | Geiger | E21B 33/0355 60/534 |
| 9,140,090 B2 * | 9/2015 | Van Wijk | E21B 33/0355 |
| 9,169,714 B2 * | 10/2015 | Edwards | E21B 33/076 |
| 9,482,075 B2 * | 11/2016 | Smedstad | E21B 41/0007 |

\* cited by examiner

PRESSURE VARIANCE SYSTEMS FOR SUBSEA FLUID INJECTION

BACKGROUND

This section is intended to introduce the reader to various aspects of art that may be related to various aspects of the presently described embodiments. This discussion is believed to be helpful in providing background information to facilitate a better understanding of the present embodiments. Accordingly, it should be understood that these statements are to be read in this light, and not as admissions of prior art.

Drilling and production operations for the recovery of offshore deposits of hydrocarbons (e.g., oil and natural gas) are taking place in deeper and deeper waters. Operations in deeper waters are typically carried out from floating vessels or platforms rather than from stationary platforms resting on the ocean floor and commonly used in shallow water. According to conventional procedures, a vessel is dynamically stationed, or moored, above a well site on the ocean floor. After drilling operations have completed, a production tree is mounted on the wellhead to control produced fluids ultimately travelling to the surface through one or more production risers or flowlines that extend from the wellhead to the surface.

One challenge facing offshore production operations is flow assurance of produced fluids from the well. During production, the produced fluids will typically comprise a mixture of oil, water, light hydrocarbon gases such as methane, and other gases such as hydrogen sulfide and carbon dioxide. In some instances, solid materials such as sand may be mixed with the fluids. The solid materials entrained in the produced fluids may typically be deposited during "shut-ins," i.e., production stoppages, and require removal. Changes in temperature, pressure, and/or chemical composition along the flowlines and risers may cause the deposition of other materials such as methane hydrates, waxes, or scales on the internal surface of the flowlines and risers. These deposits need to be periodically removed, as build-up of these materials can reduce line size and constrict flow.

It is desirable to maintain flow assurance by minimizing deposit formation in the flowline. Fluid injection systems are often used for this very purpose—to maintain a well and/or enhance flow assurance of a well. For example, fluid injection systems are used to inject hydrate-inhibiting materials, corrosion-inhibiting materials, foam-inhibiting materials, wax-inhibiting materials, and/or antifreeze to provide flow assurance, extend the life of a well, and/or increase the rate at which resources are extracted from a well. These materials are injected into the well in a controlled manner over a period of time by a fluid injection system. Some fluid injection systems require the use of umbilicals from the surface for power and controls, even if the chemicals are stored in a reservoir on the seabed. Inclusion of umbilicals is costly and adds complexity to the already-complex subsea environment.

Accordingly, a system for injecting fluids into a subsea hydrocarbon extraction component without the need for an umbilical for power or control is desirable.

BRIEF DESCRIPTION OF THE DRAWINGS

For a more detailed description of the embodiments, reference will now be made to the following accompanying drawings.

The illustrated figures are only exemplary and are not intended to assert or imply any limitation with regard to the environment, design, or process in which different embodiments may be implemented.

DETAILED DESCRIPTION OF ILLUSTRATIVE EMBODIMENTS

The systems and method of this disclosure provide a fluid injection system for injecting fluids into a subsea hydrocarbon extraction component to enhance flow assurance of produced hydrocarbon fluids flowing therein. The system and methods comprise a fluid injection system including a pressure variance device for providing power to inject fluids into the subsea hydrocarbon extraction component. The pressure variance device can generally comprise an intensifier or deintensifier in pressure communication with an external subsea environment. In this way, the hydrostatic pressure of the external subsea environment can be increased or decreased to achieve a desired injection pressure for the fluid injection system. That is, the fluid injection system is ambient seawater powered and does not rely in whole upon powered supplied by an umbilical or other source.

Where the hydrostatic head of seawater at depth is lower than the injection pressure required to inject fluid into the hydrocarbon extraction component, an intensifier is used. The intensifier increases the hydrostatic head via a piston arrangement and provides power to the fluid injection system. Where the hydrostatic head of seawater at depth is greater than the injection pressure required to inject fluid into the hydrocarbon extraction component, a deintensifier is used. The deintensifier decreases the hydrostatic head via a piston arrangement and provides power to the fluid injection system.

Figure 1:
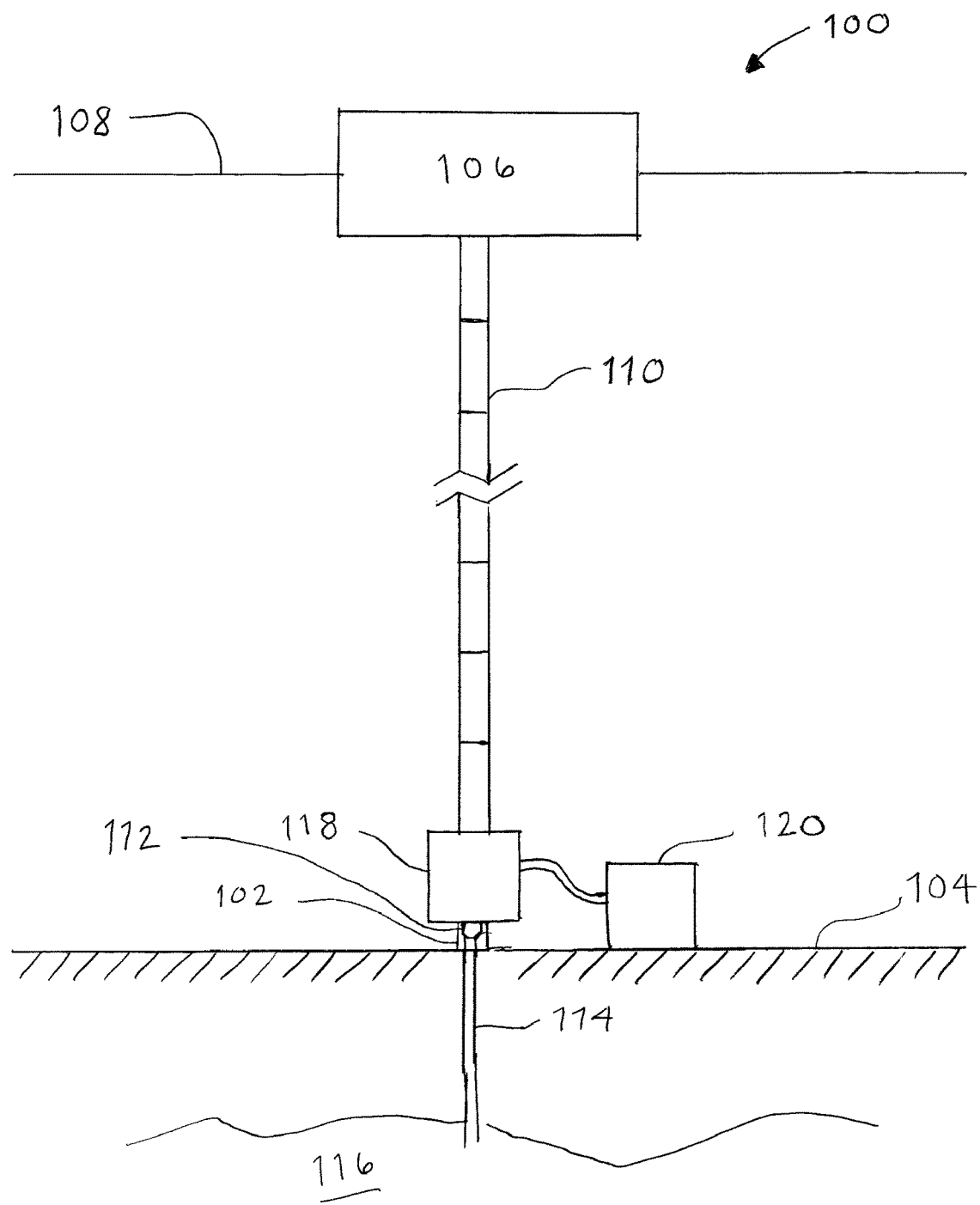
FIG. 1 illustrates a schematic view of a hydrocarbon production system including a subsea chemical injection system according to one or more embodiments.

FIG. 1 shows a subsea hydrocarbon production system 100 in accordance with various embodiments. The hydrocarbon production system includes a high-pressure wellhead housing 102 on the sea floor 104. The high-pressure wellhead housing 102 is in fluid communication with a floating rig or vessel 106 at the water's surface 108 through a marine riser 110. The marine riser 110 comprises a series of riser segments connected end-to-end and extending from the sea floor 104 to the water's surface 108.

A tubing hanger 112 is shown landed in the high-pressure wellhead housing 102 with a production string 114 extending therefrom and into a producing formation 116. The tubing hanger 112 supports the production string 114. Although shown landed in the high-pressure wellhead housing 102, the tubing hanger could optionally be landed in a separate tubing hanger spool (not shown) or in a subsea production tree, such as tree 118. The subsea production tree 118 is positioned above the high-pressure wellhead housing 102. The subsea production tree 118 may be a vertical or horizontal production tree comprising a series of flow paths and valves for providing pressure and flow control of produced hydrocarbon fluids.

A fluid injection system 120 is shown coupled to the subsea production tree 118. The fluid injection system 120 is located at or near the sea floor 104 and adjacent the high-pressure wellhead housing 102. In alternative embodiments, the fluid injection system 120 could be located remotely from the high-pressure wellhead housing. The fluid injection system 120 is configured to deliver various fluids into a hydrocarbon extraction component (e.g., high-pressure wellhead housing 102, subsea production tree 118, a tubing spool or hanger, etc.) and ultimately to the hydrocarbons being produced from the producing formation 116 and through production string 114. The fluid injection system 120 is also configured to inject chemicals into the well itself or into a production tubing. The fluid injection system 120 is configured to inject a fluid which can comprise corrosion-inhibiting materials, foam-inhibiting materials, wax-inhibiting materials, and/or antifreeze to extend the life of a well or increase the rate at which resources are extracted from a well. The fluid injection system 120 is configured to inject any type of fluid desired to be delivered to the well or to a mineral extraction component associated with the well. Typically, these materials are injected into the well in a controlled manner over a period of time by the fluid injection system 120.

Figure 2:
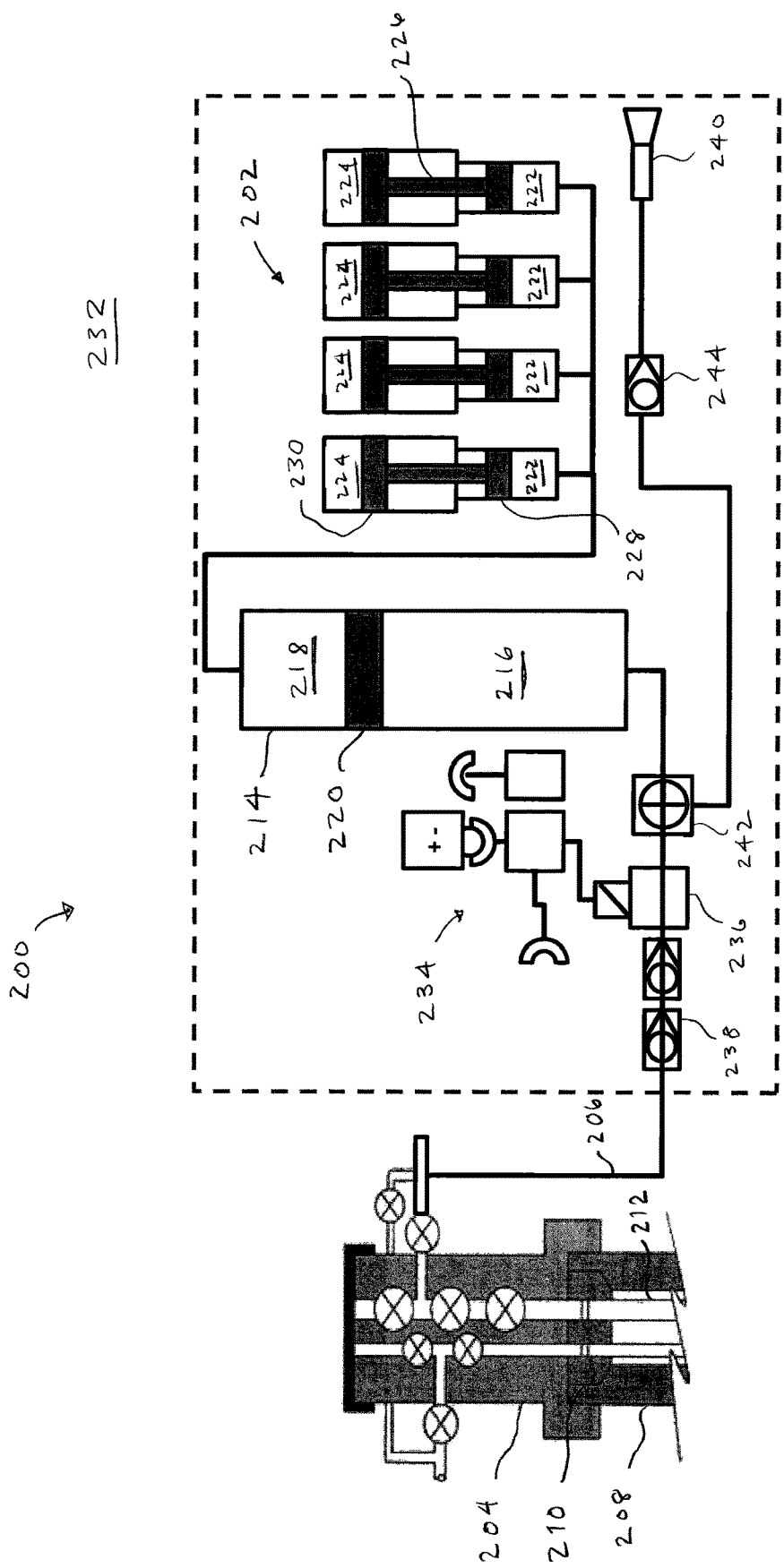
FIG. 2 illustrates a schematic view of a fluid injection system including a plurality of intensifiers according to one or more embodiments.

FIG. 2 shows a schematic view of a fluid injection system 200 according to one or more embodiments that includes a plurality of pressure variance devices 202. The fluid injection system 200 is coupled to a subsea production tree 204 by way of a fluid injection line 206. The fluid injection line 206 is configured to deliver fluid from the fluid injection system 200 to the subsea production tree 204. The subsea production tree 204 is landed on high-pressure wellhead housing 208 which is located on the sea floor. In alternative embodiments, the fluid injection line 206 can be coupled to the high-pressure wellhead housing 208.

The subsea production tree 204 is shown as a dual-bore vertical production tree for controlling flow of produced fluids. In alternative embodiments, subsea production tree 204 can be any type of tree known to those of ordinary skill in the art, such as a mono-bore production tree, horizontal production tree, spool tree, etc. The high-pressure wellhead housing 208 has a tubing hanger 210 landed therein which is configured to support one or more production tubings 212.

The fluid injection system 200 includes an accumulator 214 comprising a fluid delivery chamber 216 and a pressure chamber 218 separated by a floating piston 220. The floating piston 220 fluidly seals the fluid delivery chamber 216 from the pressure chamber 218. A fluid desired to be injected into the subsea production tree 204 is contained within fluid delivery chamber 216. The fluid to be injected into the subsea production tree 204 can include any treatment fluid, such as hydrate-inhibiting materials, corrosion-inhibiting materials, foam-inhibiting materials, wax-inhibiting materials, and/or antifreeze. Any compressible fluid can be contained within the pressure chamber 218. The pressure chamber 218 of the accumulator 214 is in fluid and pressure communication with a variance chamber 222 of each of the plurality of pressure variance devices 202. The floating piston 220 separates the hydraulic power fluid used for injection and the fluid to be injected in production system. The injection pressure on the accumulator piston 220 is generated with the pressure variance device, either intensifying or de-intensifying the seawater hydrostatic head.

Each pressure variance device 202 includes the variance chamber 222 and an ambient chamber 224 separated by a piston 226. The piston 226 fluidly seals the variance chamber 222 from the ambient chamber 224. Each piston 226 includes a variance portion 228 located in the variance chamber 222 and in pressure communication with the compressible fluid and an ambient portion 230 located in the ambient chamber 224 and in pressure communication with an external subsea environment 232. In the illustrated embodiment, the pressure variance devices 202 are configured to be intensifiers. Accordingly, each portion 230 has a greater surface area than that of portion 228. As a result, the pressure of the external subsea environment 232 acting on portion 230 will be intensified and a greater resultant force will be applied by portion 228 onto the compressible fluid contained in variance chamber 222.

The surface areas of portions 228 and 230 can be designed to achieve the desired force intensification to ensure that enough force is supplied from the pressure variance devices 202 to move piston 220 of the accumulator, thereby delivering fluid from the fluid delivery chamber 216 to the subsea production tree 204 or other subsea component. The pressure variance devices 202 are further designed to match the volume of the accumulator 214, thereby enabling the pressure variance devices to deliver the entire fluid supply from the accumulator 214. The described fluid injection system 200, comprising intensifier pressure variance devices 202, is desirable where the hydrostatic head of the water in the external subsea environment 232 is lower than the required injection pressure at the subsea production tree 204. That is, the pressure applied to piston 220 can be increased such that it will provide for fluid injection into subsea production tree 204. In other embodiments, fluid injection system 200 can include a single pressure variance device 202 or a plurality of pressure variance devices 202. Where a plurality of pressure variance devices 202 are used, the devices can be arranged in parallel or in series, or a combination thereof. When arranged in series, the force increasing effect of the pressure variance devices 202 will be multiplied. When arranged in parallel, the force increasing effect of the pressure variance devices 202 will be cumulative.

The fluid injection system 200 further includes a control system 234 configured to monitor and control various valves and other devices associated with the fluid injection system 200. The control system 234 can be retrievable in some embodiments. For instance, in the illustrated embodiment, the control system 234 is operable to control an injection valve 236 configured to regulate flow of fluid from the fluid delivery chamber 216 to the subsea production tree 204. The control system 234 can be operated by an operator at a surface location, acoustics, a scheduled timer, and/or a remotely operated vehicle (via inductive coupling), or any combination thereof.

The fluid injection system 200 also includes check valves 238 located on the fluid injection line 206 and configured to prevent backflow of the fluid from the subsea production tree 204 into the fluid injection system. In addition, fluid injection system 200 includes a remotely operated vehicle recharge port 240, a remotely operated vehicle valve 242, and a check valve 244. Remotely operated vehicle recharge port 240 can receive a corresponding component of a remotely operated vehicle, thereby allowing for the remotely operated vehicle to recharge the fluid supply contained in fluid delivery chamber 216 of the accumulator 214. In this way, the accumulator 214 can be recharged with fluid as needed. Remotely operated vehicle valve 242 can be opened or closed to allow fluid to flow from the port 240 to the accumulator 214. The check valve 244 prevents backflow of fluid from the accumulator 314 to the port 240.

Figure 3:
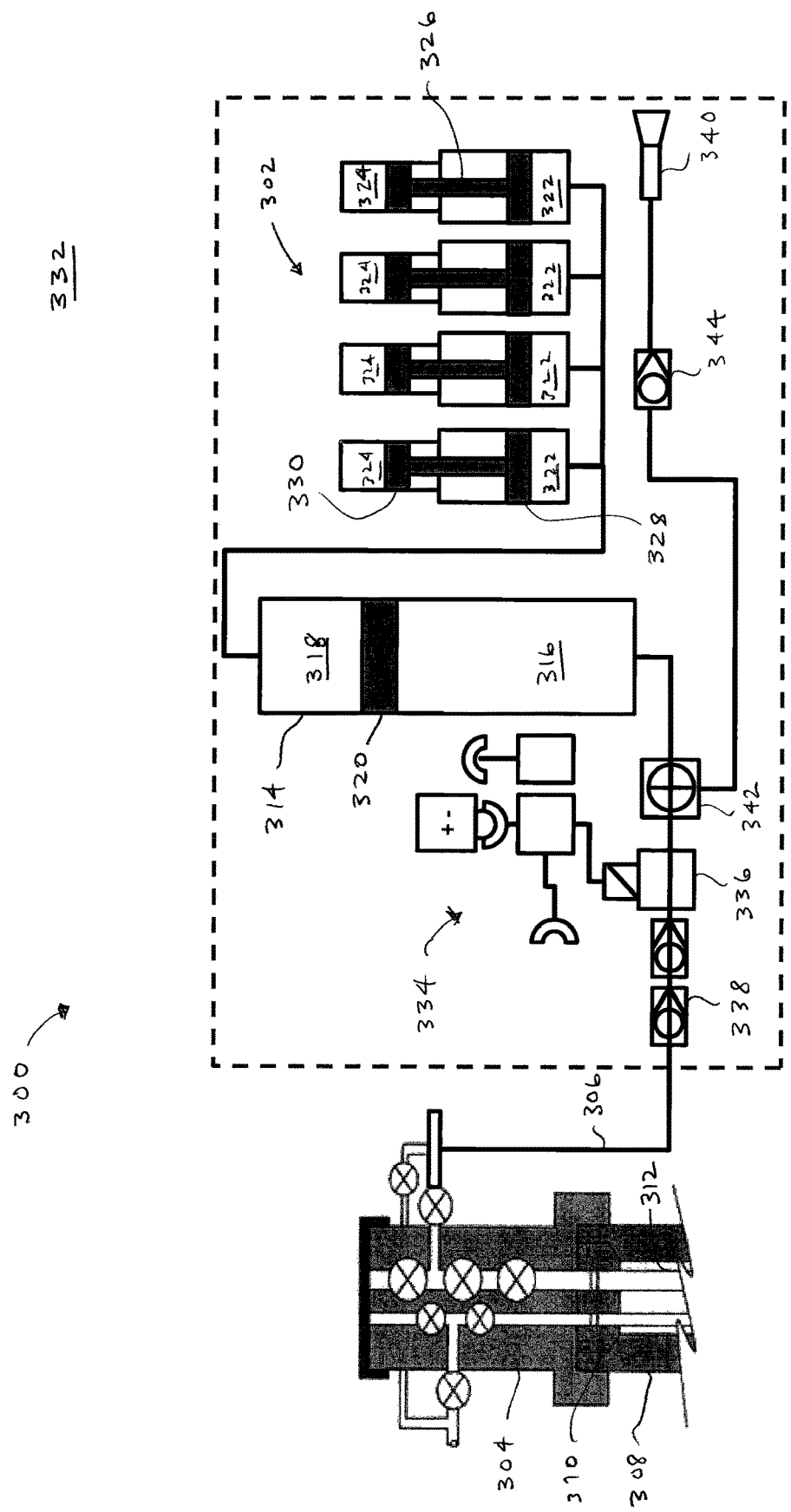
FIG. 3 illustrates a schematic view of a fluid injection system including a plurality of deintensifiers according to one or more embodiments.

FIG. 3 shows a schematic view of a fluid injection system 300 according to one or more embodiments that includes a plurality of pressure variance devices 302. Fluid injection system 300 is coupled to a subsea production tree 304 by way of fluid injection line 306. Fluid injection line 306 is configured to deliver fluid from the fluid injection system 300 to the subsea production tree 304. The subsea production tree 304 is landed on high-pressure wellhead housing 308 which is located on the sea floor. Subsea production tree 304 is shown as a dual-bore vertical production tree for controlling flow of produced fluids. In alternative embodiments, tree 304 can be any type of tree known to those of ordinary skill in the art, such as a mono-bore production tree, horizontal production tree, spool tree, etc. The high-pressure wellhead housing 308 has a tubing hanger 310 landed therein which is configured to support one or more production tubings 312.

The fluid injection system 300 includes an accumulator 314 comprising a fluid delivery chamber 316 and a pressure chamber 318 separated by a floating piston 320. The floating piston 320 fluidly seals the fluid delivery chamber 316 from the pressure chamber 318. A fluid desired to be injected into the subsea production tree 304 is contained within fluid delivery chamber 316. The fluid to be injected into the subsea production tree 304 can include any of hydrate-inhibiting materials, corrosion-inhibiting materials, foam-inhibiting materials, wax-inhibiting materials, and/or anti-freeze. Any compressible fluid can be contained within the pressure chamber 318. The pressure chamber 318 of the accumulator 314 is in fluid communication with a variance chamber 322 of each of the plurality of pressure variance devices 302.

Each pressure variance device 302 includes the variance chamber 322 and an ambient chamber 324 separated by a piston 326. The piston 326 fluidly seals the variance chamber 322 from the ambient chamber 324. Each piston 326 includes a variance portion 328 located in the variance chamber 322 and in pressure communication with the compressible fluid and an ambient portion 330 located in the ambient chamber 324 and in pressure communication with an external subsea environment 332. In the illustrated embodiment, the pressure variance devices 302 are configured to be deintensifiers. Accordingly, each portion 330 has a smaller surface area than that of portion 328. As a result, the pressure of the external subsea environment 332 acting on portion 330 will be deintensified and a lower resultant force will be applied by portion 328 onto the compressible fluid contained in variance chamber 322.

The surface areas of portions 328 and 330 can be designed to achieve the desired force intensification to ensure that enough force is supplied from the pressure variance devices 302 to move piston 320 of the accumulator, thereby delivering fluid from the fluid delivery chamber 316 to the subsea production tree 304. The pressure variance devices 302 are further designed to match the volume of the accumulator 314, thereby enabling the pressure variance devices to deliver the entire fluid supply from the accumulator 314. The described fluid injection system 300, comprising deintensifier pressure variance devices 302, is desirable where the hydrostatic head of the water in the external subsea environment 332 is greater than the required injection pressure at the subsea production tree 304. That is, the pressure applied to piston 320 can be decreased such that it will provide for fluid injection into subsea production tree 304. In other embodiments, fluid injection system 300 can include a single pressure variance device 302 or a plurality of pressure variance devices 302. Where a plurality of pressure variance devices 302 are used, the devices can be arranged in parallel or in series, or a combination thereof. When arranged in series, the force decreasing effect of the pressure variance devices 302 will be multiplied. When arranged in parallel, the force decreasing effect of the pressure variance devices 202 will be cumulative.

The illustrated fluid injection system 300 further includes a retrievable control system 334 configured to monitor and control various valves and other devices associated with the fluid injection system 300. For instance, in the illustrated embodiment, the control system 334 is operable to control an injection valve 336 configured to regulate flow of fluid from the fluid delivery chamber 316 to the subsea production tree 304. The control system 334 can be operated by an operator at a surface location, acoustics, a scheduled timer, and/or a remotely operated vehicle (via inductive coupling), or any combination thereof.

The illustrated fluid injection system 300 also includes check valves 338 located on the fluid injection line 306 and configured to prevent backflow of the fluid from the subsea production tree 304 into the fluid injection system. In addition, fluid injection system 300 includes a remotely operated vehicle recharge port 340 and an associated remotely operated vehicle valve 342 and check valve 344. Remotely operated vehicle recharge port 340 can receive a corresponding component of a remotely operated vehicle, thereby allowing for the remotely operated vehicle to recharge the fluid supply contained in fluid delivery chamber 316 of the accumulator 314. In this way, the accumulator 314 can be recharged with fluid as needed. Remotely operated vehicle valve 342 can be opened or closed to allow fluid to flow from the port 340 to the accumulator 314. The check valve 344 prevents backflow of fluid from the accumulator 314 to the port 340.

In other embodiments, a fluid injection system, such as systems 200 and 300 described above, can include switchable pressure variance devices that may be switched from intensifier to deintensifier, or vice versa.

In addition to the embodiments described above, many examples of specific combinations are within the scope of the disclosure, some of which are detailed below:

Example 1

A system for injecting a fluid into a subsea hydrocarbon extraction component, comprising:

a pressure variance device ("PVD") including an ambient chamber and a variance chamber separated by a PVD piston, the ambient chamber configured to receive ambient pressure from an external subsea environment and transfer the pressure to the variance chamber via the PVD piston;

an accumulator including a fluid delivery chamber and a pressure chamber separated by an accumulator piston, the pressure chamber configured to receive the pressure from the variance chamber and transfer the pressure to the fluid delivery chamber via the accumulator piston; and a control system configured to regulate injection of the fluid from the fluid delivery chamber into the subsea hydrocarbon extraction component.

Example 2

The system of Example 1, wherein the fluid in the accumulator is rechargeable by a remotely operated vehicle.

Example 3

The system of Example 1, wherein the accumulator piston comprises a floating piston.

Example 4

The system of Example 1, wherein a first portion of the PVD piston is located in the ambient chamber and a second portion of the PVD piston is located in the variance chamber and a surface area of the portion in the ambient chamber is greater than a surface area of the portion in the variance chamber.

Example 5

The system of Example 4, wherein the pressure variance device is an intensifier.

Example 6

The system of Example 1, wherein a first portion of the PVD piston is located in the ambient chamber and a second portion of the PVD piston is located in the variance chamber and a surface area of the portion in the variance chamber is greater than a surface area of the portion in the ambient chamber.

Example 7

The system of Example 6, wherein the pressure variance device is an intensifier.

Example 8

The system of Example 1, further comprising a plurality of PVDs.

Example 9

The system of Example 8, wherein the plurality of PVDs are arranged in series.

Example 10

The system of Example 8, wherein the plurality of PVDs are arranged in parallel.

Example 11

The system of Example 1, wherein the control system is retrievable by a remotely operated vehicle.

Example 12

The system of Example 1, wherein the subsea hydrocarbon extraction component is a production tree.

Example 13

The system of Example 1, wherein the subsea hydrocarbon extraction component is a wellhead.

Example 14

The system of Example 1, wherein the fluid is selected from one or more of a hydrate inhibitor, a corrosion inhibitor, a foam inhibitor, a wax-inhibitor, and an antifreeze.

Example 15

A method for injecting a fluid into a subsea hydrocarbon extraction component, comprising:
  providing an accumulator in fluid communication with the subsea wellhead;
  providing a pressure variance device ("PVD") in pressure communication with an external subsea environment and the accumulator;
  transferring pressure from the external subsea environment to the accumulator via the PVD; and
  injecting the fluid into the subsea hydrocarbon extraction component utilizing the pressure transferred to the accumulator.

Example 16

The method of Example 15, further comprising intensifying the pressure of the external subsea environment via the PVD where injection pressure is greater than a hydrostatic pressure of the subsea environment.

Example 17

The method of Example 15, further comprising deintensifying the pressure of the external subsea environment via the PVD where injection pressure is lower than a hydrostatic pressure of the subsea environment.

Example 18

The method of Example 15, further comprising regulating the fluid injection via a control system.

Example 19

The method of Example 15, further comprising providing a plurality of PVDs.

Example 20

A system for producing hydrocarbons from a subsea well, comprising:
  a floating platform;
  a production riser extending from the floating platform to a subsea wellhead adjacent the well;
  a production tree locatable above the subsea wellhead; and
  a chemical injection system configured to inject chemicals into the subsea well, comprising:
    a pressure variance device ("PVD") including an ambient chamber and a variance chamber separated by a PVD piston, the ambient chamber configured to receive ambient pressure from an external subsea environment and transfer the pressure to the variance chamber via the PVD piston;
    an accumulator including a fluid delivery chamber and a pressure chamber separated by an accumulator piston, the pressure chamber configured to receive the pressure from the variance chamber and transfer the pressure to the fluid delivery chamber via the accumulator piston; and
    a control system configured to regulate injection of the fluid from the fluid delivery chamber into the subsea well.

This discussion is directed to various embodiments of the present disclosure. The drawing figure is not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout this description and claims to refer to particular features or components. As one skilled in the art will appreciate, different persons may refer to the same feature or component by different names. This document does not intend to distinguish between components or features that differ in name but are the same structure or function. The drawing figure is not necessarily to scale. Certain features and components herein may be shown exaggerated in scale or in somewhat schematic form and some details of conventional elements may not be shown in interest of clarity and conciseness.

In this discussion and in the claims, the terms "including" and "comprising" are used in an open-ended fashion, and thus should be interpreted to mean "including, but not limited to . . . ."

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

We claim:

1. A system for injecting a treatment fluid into a subsea well through a subsea hydrocarbon extraction component, comprising:
   a pressure variance device ("PVD") including an ambient chamber and a variance chamber separated by a PVD piston, the ambient chamber configured to receive ambient pressure from an external subsea environment and transfer the pressure to fluid in the variance chamber via the PVD piston;
   an accumulator including a fluid delivery chamber and a pressure chamber separated by an accumulator piston, the pressure chamber configured to receive the pressure from the fluid in the variance chamber and transfer the pressure to the treatment fluid in the fluid delivery chamber via the accumulator piston; and
   a control system configured to regulate injection of the treatment fluid from the fluid delivery chamber into the subsea hydrocarbon extraction component for injection into the subsea well.

2. The system of claim 1, wherein a first portion of the PVD piston is located in the ambient chamber and a second portion of the PVD piston is located in the variance chamber and a surface area of the portion in the ambient chamber is greater than a surface area of the portion in the variance chamber.

3. The system of claim 2, wherein the pressure variance device is an intensifier configured to intensify the pressure acting on the ambient piston.

4. The system of claim 1, wherein a first portion of the PVD piston is located in the ambient chamber and a second portion of the PVD piston is located in the variance chamber and a surface area of the portion in the variance chamber is greater than a surface area of the portion in the ambient chamber.

5. The system of claim 4, wherein the pressure variance device is a deintensifier configured to deintensify the pressure acting on the ambient piston.

6. The system of claim 1, further comprising a plurality of PVDs.

7. The system of claim 6, wherein the plurality of PVDs are arranged in series.

8. The system of claim 6, wherein the plurality of PVDs are arranged in parallel.

9. The system of claim 1, wherein the control system is retrievable by a remotely operated vehicle.

10. The system of claim 1, wherein the subsea hydrocarbon extraction component is a production tree.

11. The system of claim 1, wherein the subsea hydrocarbon extraction component is a wellhead.

12. The system of claim 1, wherein the treatment fluid is selected from one or more of a hydrate inhibitor, a corrosion inhibitor, a foam inhibitor, a wax-inhibitor, and an antifreeze.

13. The system of claim 1, wherein the treatment fluid in the accumulator is rechargeable by a remotely operated vehicle.

14. The system of claim 1, wherein the accumulator piston comprises a floating piston.

15. A system for producing hydrocarbons from a subsea well, comprising:
   a floating platform;
   a production riser extending from the floating platform to a subsea wellhead adjacent the subsea well;
   a production tree locatable above the subsea wellhead; and
   a treatment fluid injection system configured to inject a treatment fluid into the subsea well, comprising:
      a pressure variance device ("PVD") including an ambient chamber and a variance chamber separated by a PVD piston, the ambient chamber configured to receive ambient pressure from an external subsea environment and transfer the pressure to fluid in the variance chamber via the PVD piston;
      an accumulator including a fluid delivery chamber and a pressure chamber separated by an accumulator piston, the pressure chamber configured to receive the pressure from the fluid in the variance chamber and transfer the pressure to the treatment fluid in the fluid delivery chamber via the accumulator piston; and
      a control system configured to regulate injection of the treatment fluid from the fluid delivery chamber into the subsea well.

16. The system of claim 15, wherein the control system is operable by an operator at a surface location, acoustics, a scheduled timer, and/or a remotely operated vehicle, or any combination thereof.

* * * * *